United States Patent
Qian et al.

(10) Patent No.: US 9,615,112 B2
(45) Date of Patent: Apr. 4, 2017

(54) METHOD, SYSTEM, PLAYER AND MOBILE TERMINAL FOR ONLINE VIDEO PLAYBACK

(71) Applicant: HUIZHOU TCL MOBILE COMMUNICATION CO., LTD., Huizhou, Guangdong (CN)

(72) Inventors: Wen Qian, Huizhou (CN); HongWei Qiao, Huizhou (CN)

(73) Assignee: HUIZHOU TCL MOBILE COMMUNICATION CO., LTD., HuiZhou, Guangdong (CN)

( * ) Notice: Subject to any disclaimer, the term of this patent is extended or adjusted under 35 U.S.C. 154(b) by 0 days.

(21) Appl. No.: 14/762,267

(22) PCT Filed: Jul. 18, 2014

(86) PCT No.: PCT/CN2014/082475
§ 371 (c)(1),
(2) Date: Jul. 21, 2015

(87) PCT Pub. No.: WO2015/176375
PCT Pub. Date: Nov. 26, 2015

(65) Prior Publication Data
US 2016/0142742 A1 May 19, 2016

(30) Foreign Application Priority Data
May 23, 2014 (CN) .......................... 2014 1 0220805

(51) Int. Cl.
H04N 7/16 (2011.01)
H04N 21/238 (2011.01)
(Continued)

(52) U.S. Cl.
CPC ..... H04N 21/238 (2013.01); H04N 21/23439 (2013.01); H04N 21/234345 (2013.01);
(Continued)

(58) Field of Classification Search
CPC combination set(s) only.
See application file for complete search history.

(56) References Cited

U.S. PATENT DOCUMENTS

2009/0013210 A1* 1/2009 McIntosh ............ H04L 12/2697
714/4.1
2012/0137335 A1* 5/2012 Yun ........................ G09G 5/005
725/93
(Continued)

FOREIGN PATENT DOCUMENTS

CN 102088620 A 6/2011
CN 102149005 A 8/2011
(Continued)

Primary Examiner — Brian T Pendleton
Assistant Examiner — Alexander Gee
(74) Attorney, Agent, or Firm — Ladas & Parry LLP

(57) ABSTRACT

A method for online video playback includes: loading the first video segment corresponding to the lowest class of bit rates from the version of the lowest class of bit rates at an initial playback; and choosing to load and play a video segment corresponding to an appropriate class of bit rates according to the bit rate corresponding to the current network traffic and the resolution supported by a playing terminal after the video has been playing steadily. The method for online video playback can automatically choose to play videos encoded at an appropriate bit rate according to the current internet speed so that the playback is smooth and uninterrupted.

17 Claims, 1 Drawing Sheet

(51) Int. Cl.
*H04N 21/2343* (2011.01)
*H04N 21/24* (2011.01)
*H04N 21/61* (2011.01)
*H04N 21/643* (2011.01)
*H04N 21/258* (2011.01)
*H04N 21/845* (2011.01)

(52) U.S. Cl.
CPC . *H04N 21/234381* (2013.01); *H04N 21/2402* (2013.01); *H04N 21/25825* (2013.01); *H04N 21/6131* (2013.01); *H04N 21/64322* (2013.01); *H04N 21/8456* (2013.01)

(56) References Cited

U.S. PATENT DOCUMENTS

| | | | |
|---|---|---|---|
| 2012/0203891 A1* | 8/2012 | Jiang | H04N 17/004 709/224 |
| 2013/0103849 A1* | 4/2013 | Mao | H04N 21/8456 709/231 |
| 2013/0223509 A1* | 8/2013 | Tweedale | H04N 21/23418 375/240.01 |
| 2013/0254418 A1* | 9/2013 | Zhang | H04L 65/60 709/231 |
| 2013/0272374 A1* | 10/2013 | Eswaran | H04L 65/602 375/240.02 |
| 2014/0348246 A1 | 11/2014 | Fu et al. | |
| 2015/0172352 A1* | 6/2015 | Gopalakrishnan | H04L 65/608 709/219 |

FOREIGN PATENT DOCUMENTS

| | | |
|---|---|---|
| CN | 102263942 A | 11/2011 |
| CN | 103036888 A | 4/2013 |
| CN | 103220550 A | 7/2013 |
| CN | 103269331 A | 8/2013 |

\* cited by examiner

METHOD, SYSTEM, PLAYER AND MOBILE TERMINAL FOR ONLINE VIDEO PLAYBACK

CROSS REFERENCE TO RELATED APPLICATION

This application claims the priority of International Application No. PCT/CN2014/082475, filed on Jul. 18, 2014, which claims priority to Chinese Application No. 201410220805.7, filed on May 23, 2014. The entire disclosures of each of the above applications are incorporated herein by reference.

BACKGROUND OF THE INVENTION

1. Field of the Invention

The present invention relates to the field of consumer electronics, and specifically to a method, system, player and mobile terminal for online video playback.

2. Description of the Prior Art

Nowadays, more and more users are watching videos on their mobile phones. With the prevalence of wireless fidelity (wifi) and the coming of the age of 4G, long term evolution (LTE) high speed broadband allows users to watch online videos at 2M bps bandwidth. In the near future, people will be able to watch online TV whenever and wherever they are, including on subway or buses, and no longer need to worry about the internet speed.

The growing number of users also gives rise to new requirements on video players, such as smoothly playing a video in accordance with the network traffic and mobile phone specifications. However, existing players cannot test and adjust themselves to the current internet speed, thus cannot automatically choose to play videos encoded at a bit rate suitable for the current internet speed. Whenever users find that a video is not playing smoothly, they must manually choose the video version encoded at a lower bit rate. When the internet speed becomes faster, users must manually switch to a high-definition (HD) version, as the players cannot auto-adjust to the change. In addition, when the video starts, the loading process is slower and the buffer timer is longer if a HD version is chosen.

Therefore, the existing technology needs to be improved and further developed.

SUMMARY OF THE INVENTION

An object of the present invention is to provide a method, system, player and mobile terminal for online video playback, so to solve the defects of the existing technology. The method for online video playback can automatically choose to play videos encoded at an appropriate bit rate according to the current internet speed so that the playback is smooth and uninterrupted.

According to the present invention, a method for online video playback, comprises: segmenting a video into several versions of video segments targeting different bit rates form low to high in advance, with video segments of each version corresponding to a specific class of bit rates; loading the first video segment corresponding to the lowest class of bit rates from the version of the lowest class of bit rates at an initial playback; testing automatically the network traffic according to a predefined time interval after the video has been playing steadily; determining whether to choose a high-bit rate video segment to play later according to the current network traffic; upgrading gradually to the highest bit rate if the network traffic is good; if the internet environment permits, choosing automatically and playing the video segment corresponding to an appropriate bit rate according to the resolution of a playing terminal; and downgrading gradually to low-bit rate video segments if the network traffic is busy; if the internet environment permits, choosing automatically and playing the video segment corresponding to appropriate bit rate according to the resolution of a playing terminal.

Furthermore, the step of segmenting the video into several versions of video segments targeting different bit rates form low to high in advance, further comprises organizing the information of video segments of different versions into a profile.

Furthermore, classes of different bit rates from low to high as referred to in the step of segmenting the video into several versions of video segments corresponding to different bit rates form low to high in advance, comprise: a first class of bit rates from 700 to 1199 kbps, a second class of bit rates from 1200 to 2500 kbps, a third class of bit rates from 2051 kbps to 2 Mbps, and a fourth class of bit rates from 2 Mbps to 10 Mbps and above.

Furthermore, steps before loading and playing the first video segment corresponding to the lowest class of bit rates from the version of the lowest class of bit rates at an initial playback further comprise testing the resolution that can be supported by a playing terminal and calculating the optimum bit rate that can be supported by the playing terminal.

Furthermore, steps after the loading and playing of the first video segment corresponding to the lowest class of bit rates from the version of the lowest class of bit rates further comprise: recording a time stamp at the point where the playback of the first video segment stops; and choosing and playing the video segment corresponding to an appropriate class of bit rates; specifically, playing the chosen video segment corresponding to the appropriate class of bit rates from the time stamp of the first video segment.

According to the present invention, a method for online video playback, comprises: segmenting a video into several versions of video segments targeting different bit rates form low to high in advance, with video segments of each version corresponding to a specific class of bit rates; loading the first video segment corresponding to the lowest class of bit rates from the version of the lowest class of bit rates at an initial playback; and testing automatically the network traffic, and choosing to load and play a video segment corresponding to an appropriate class of bit rates according to the bit rate corresponding to the current network traffic and the resolution supported by a playing terminal after the video has been playing steadily.

Furthermore, the step of segmenting the video into several versions of video segments targeting different bit rates form low to high in advance, further comprises organizing the information of video segments of different versions into a profile.

Furthermore, classes of different bit rates from low to high as referred to in the step of segmenting the video into several versions of video segments corresponding to different bit rates form low to high in advance, comprise: a first class of bit rates from 700 to 1199 kbps, a second class of bit rates from 1200 to 2500 kbps, a third class of bit rates from 2051 kbps to 2 Mbps, and a fourth class of bit rates from 2 Mbps to 10 Mbps and above.

Furthermore, the steps of choosing to load and play the video segment corresponding to an appropriate class of bit rates according to the bit rate corresponding to the current network traffic and the resolution supported by a playing terminal after the video has been playing steadily, comprises: testing automatically the network traffic after the video has been playing steadily; determining whether to choose a high-bit rate video segment to play later according to the current network traffic; upgrading gradually to the highest bit rate if the network traffic is good; if the internet environment permits, choosing automatically and playing the video segment corresponding to an appropriate bit rate according to the resolution of a playing terminal; downgrading gradually to low-bit rate video segments if the network traffic is busy; if the internet environment permits, choosing automatically and playing the video segment corresponding to appropriate bit rate according to the resolution of a playing terminal.

Furthermore, steps before loading and playing the first video segment corresponding to the lowest class of bit rates from the version of the lowest class of bit rates at an initial playback further comprise testing the resolution that can be supported by a playing terminal and calculating the optimum bit rate that can be supported by the playing terminal.

Furthermore, steps to retrieve the bit rate corresponding to the current network traffic comprise: retrieving the speed of the current network by applying for a speed test to a speed-testing website through the website's interface; choosing the highest bit rate that can be supported by the current internet speed after comparing the internet speed with the bit rates on a video server.

Furthermore, the step of the player automatically testing the network traffic comprises: the player automatically testing the network traffic according to a predefined time interval.

Furthermore, steps after the loading and playing of the first video segment corresponding to the lowest class of bit rates from the version of the lowest class of bit rates further comprise: recording a time stamp at the point where the playback of the first video segment stops; choosing and playing the video segment corresponding to an appropriate class of bit rates; specifically, playing the chosen video segment corresponding to the appropriate class of bit rates from the time stamp of the first video segment.

According to the present invention, a system for online video playback, comprises: a video segmenting module, for segmenting a video into several versions of video segments targeting different bit rates from low to high in advance, with the video segment of a version corresponding to a specific class of bit rates; an initial playback controlling module, for controlling the player to begin by loading and playing the first video segment corresponding to the lowest class of bit rates from the version of the lowest class of bit rates; an automatic playback controlling module, for controlling the player to automatically test the network traffic after the video has been playing steadily, and choose to load and play a video segment corresponding to an appropriate class of bit rates according to the bit rate corresponding to the current network traffic and the resolution that can be supported by the playing terminal.

Furthermore, the automatic playback controlling module comprises: an automatic test unit, for testing automatically the network traffic after the video has been playing steadily; a determining unit, for determining whether high-bit rate videos should be chosen and played later according to the current network traffic; an upgrade controlling unit, for gradually transiting to the highest bit rate and automatically choosing to play the video segments corresponding to the appropriate bit rate according to the resolution of the playing terminal when the internet environment permits; a downgrade controlling unit, for transiting to a low-bit rate video version when the network traffic is busy, and automatically choosing to play the video segments corresponding to the appropriate bit rate according to the resolution of the playing terminal when the internet environment permits.

Furthermore, the system further comprises: a test and calculation module, for testing the resolution that can be supported by the playing terminal, and calculating the optimum bit rate that can be supported by the playing terminal.

Furthermore, the automatic test unit further automatically tests the network traffic according to the predefined time interval after the video has been playing steadily.

A player performs the method as mentioned above.

A mobile terminal comprises a player as mentioned above.

The method, system, player and mobile terminal for online video playback provided by the present invention equip the mobile terminal player with a new function: automatically choosing videos encoded at an appropriate bit rate according to the current Internet speed when playing online videos. It provides the convenience of smooth and uninterrupted playback to users.

The player for smart streaming media playback proposed by the present invention further comprises following functions:

1) The player chooses to play files encoded at a lower bit rate first when starting to play a video. Videos encoded at a lower bit rate comprise smaller amount of data, therefore the buffer time becomes shorter.

2) The player tests the network traffic and automatically switches to the highest bit rate possible with the current status when connecting to the internet. If the network traffic deteriorates, the player would adjust itself and automatically switch to lower bit rate. When the network traffic is good, the player would switch to a higher bit rate so that playing the video becomes clearer and smoother.

3) The player can calculate the optimum bit rate according to a mobile phone's screen resolution, and adjust to the optimum bit rate when it is supported by the internet speed.

DETAILED DESCRIPTION OF PREFERRED EMBODIMENTS

The present invention provides the method, system, player and mobile terminal for online video playback, which are mainly applied to the field of mobile terminals, such as mobile phones. When starting to play a video, the player chooses to play files encoded at a lower bit rate first. Videos encoded at a lower bit rate comprise smaller amount of data, therefore the buffer time becomes shorter. The player tests the network traffic and automatically switches to the highest bit rate possible with the current status when connecting to the internet. If the network traffic deteriorates, the player would adjust itself and automatically switch to lower bit rate. When the network traffic is good, the player would upgrade to a higher bit rate so that videos are clearer and smoother. The player can also calculate the optimum bit rate according to a mobile phone's screen resolution, and adjust to the optimum bit rate when it is supported by the internet speed.

To further clarify the purpose, technical solution and benefits of the present invention, more detailed explanation is provided with figures and embodiments hereafter. It should be understood that embodiments described herein are solely for the purpose of explaining the present invention, not for imposing limitations on the present invention.

Figure 1:
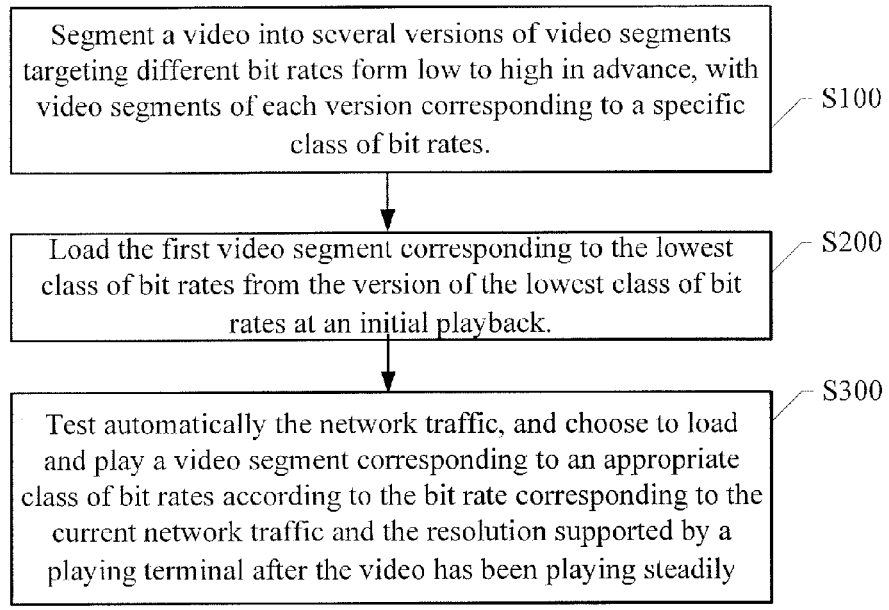
FIG. 1 is a flow chart of a method for online video playback according to a preferred embodiment of the present invention.

Please refer to FIG. 1, showing a flow chart of a method for online video playback according to a preferred embodiment of the present invention. The method in FIG. 1 comprises:

Step S100: segmenting a video into several versions of video segments targeting different bit rates, from low to high. The video segment of each version corresponds to a specific class of bit rates.

Thus, the present invention needs to segment a video into several versions of different bit rates in advance, with the video segment of each version corresponding to a specific class of bit rates. For example, to properly handle a video on a video server, the first thing to do is to segment the video into several versions of different bit rates. The bit rates can be classified, for instance, into four classes, from low to high: the first class is 700 to 1199 kbps, the second class is 1200 to 2500 kbps, the third class is 2501 kbps to 2 Mbps, and the fourth class is 2 Mbps to 10 Mbps or above.

Next, segment the video into several versions of video segments that are suitable to be played at bit rates 700 to 1199 kbps, 1200 to 2500 kbps, 2501 kbps to 2 Mbps, and 5 Mbps to 10 Mbps respectively, as shown in the following examples (simply given for the benefits of explanation):

A video segment of resolution 320×480 would be corresponding to the first class of bit rates, 700 to 1199 kbps;

A video segment of resolution 720×480 would be corresponding to the second class of bit rates, 1200 to 2500 kbps; namely, 480i or 480p videos belong to this group;

A video segment of resolution 800×600 would be corresponding to the third class of bit rates, 2501 kbps to 2M;

A video segment of resolution 720p, 1080p and above would be corresponding to the fourth class of bit rates, 2M to 5M to 10M and above.

Preferably, organizing the information of video segments into a profile after the video is segmented into several versions of segments.

Bit rate refers to the amount of data flow per second. If the bit rate is higher, the display would be finer, the loss of display quality would be less and it is closer to the original. But at the same time, a larger storage space is needed to store these data. In other words, if the bit rate is higher, the data amount would be larger, and the demand for internet speed would be higher. Therefore, as bit rate refers to the amount of data flow per second, a high bit rate requires a higher network bandwidth. Insufficient bandwidth may result in display lags or frame losses.

Step S200: loading and playing the first video segment corresponding to the lowest class of bit rates from the version of the lowest class of bit rates at an initial playback.

Imagine playing an online video on a mobile phone. When the video starts, the player loads and analyzes the data in the profile. At an initial playback, the player loads the first video segment from the version of the lowest class of bit rates. Taking the examples hereinbefore, the video segment of resolution 320×480 corresponding to the first class of bit rates 700 to 1199 kbps would be the first loaded by the player. As the bit rate is low and the data amount is small, the buffer time is short. Users can clearly feel an improvement in playback speed and buffer time.

Step S300: testing the network traffic automatically after the video has been playing steadily. According to the bit rate corresponding to the current network traffic and the resolution that can be supported by the playing terminal, the player chooses the video segment corresponding to an appropriate class of bit rates to load and play.

Specifically, when the video is playing steadily, the player automatically tests the network traffic, by which it decides whether to switch to video segments corresponding to higher bit rates later. If the network traffic is good, the player gradually transits to the highest bit rate, and automatically chooses to play the video segment corresponding to an appropriate bit rate that is supported by the network traffic and the resolution of the playing terminal (e.g. a mobile phone). If the network traffic is busy, the player gradually transits to a low-bit rate version, and automatically chooses to play the video segment corresponding to an appropriate rate that is supported by the network traffic and the resolution of the playing terminal.

A detailed explanation of the method proposed by the present invention is provided hereinafter through specific embodiments. When putting into practice, the method of the present invention mainly comprises the following steps:

Step one: testing functions of a playing terminal (e.g. a mobile phone) to examine the resolution that can be supported and calculate the optimum bit rate.

The clarity of the video played is related to the screen resolution of the playing terminal (e.g. a mobile phone) to a certain extent.

The method of the present invention adopts a formula:

$$\text{data density} = \text{bits}/(\text{pixel}*\text{frame});$$

where "bits" stands for the bit rate a video corresponds to, "pixel" is the result of transverse pixels multiplying vertical pixels, and "frame" stands for frame rate (measured by number of frames per second, "fps"), with many mobile phones nowadays capable of supporting up to 30 fps.

In the present embodiment, bit rate can be retrieved from the internet, whereas pixel and frame rate are parameters of the mobile phone. By making use of these known parameters, the video's data density, namely the clarity of the video when it is played on different mobile phones, can be calculated. The data density can intuitively reflect users' watching experience. In other words, the clarity that users perceive is decided by two factors: the bit rate by which the video source is encoded, and the parameters of the mobile phone functions. As the mobile phone's parameters, the screen pixel and frame rate, are fixed, users can experience clearer display when a video encoded at a higher bit rate is played in a good internet environment.

An analysis of the clarity of the video based on the data density formula is as follows:

1) With a fixed bit rate, when the resolution becomes smaller, the data density becomes higher, meaning that images are clearer. Likewise, if the mobile phone screen's resolution is higher, corresponding to higher density, then a higher bit rate is required.

2) The distinction between HD videos and standard-definition (SD) videos is based on the data density.

When the playing terminal (e.g. a mobile phone) supports a HD standard of 720p or 1080p and data density of 0.25 to 0.35 and above, the optimum bit rate falls around 5 Mb to 10 Mb and above. It means that the playing terminal (e.g. a mobile phone) supports the video segment corresponding to the optimum bit rate, or video segments corresponding to bit rates lower than the optimum bit rate.

When the playing terminal (e.g. a mobile phone) supports a SD standard of a 480p or 480p and data density of 0.12 to 0.18 and above, the optimum bit rate falls around 1200 to 2500 kbps. So the playing terminal supports the video segment corresponding to the optimum bit rate, or video segments corresponding to bit rates lower than the optimum bit rate.

Therefore, the optimum bit rate of the current playing terminal (e.g. a mobile phone) playing videos of different data density is obtained. The value is relatively fixed.

Thus, if users want to watch HD videos on a mobile phone with high resolution, the bit rate must meet a certain standard so to provide satisfactory clarity.

Step two: playing videos; starting from the video corresponding to the lowest class of bit rates.

At an initial playback, the player starts to load the first video segment of the version of the lowest class of bit rates. Taking the example hereinbefore, the player would first load and play the video segment of resolution 320×480 corresponding to the first class of hit rates 700 to 1199 kbps. As the bit rate is low and the data amount is small, the buffer time is short. Users can clearly feel an improvement in playback speed and buffer time. But because the mobile phone screen is larger with a higher resolution, a video corresponding to the first class of bit rates 700 to 1199 kbps is obviously not clear enough when played. Generally, internet speed=bit rate*log2 (encoding digits). Given the positive relation between the internet speed and the bit rate, if the current internet speed is higher than the lowest bit rate, the video would be played smoothly;

if the current internet speed is lower than the lowest bit rate, the video would stutter and cannot be played, as the lowest bit rate is the minimum requirement to be met to play videos.

Many software for testing internet speed are available on the market. For example, a software program "mobile bandwidth meter" on "speedtest.cn." website can test the upload and download speeds of the mobile phone at a given moment. The present embodiment can apply for speed test through the website's interface and get the current internet speed by which the mobile phone is operating. For example, the current download speed of the phone is 2.5 Mbps, and the starting time T=20131218180622. The time interval between each automatic speed test is five minutes.

Step four: choosing the video source according to the internet speed.

When the current internet speed is retrieved, it is sent to the video server and compared with existing videos on the server. The mobile phone then automatically chooses the video source corresponding to the highest bit rate that can be played with the current internet speed.

Given the positive relation between the internet speed and the bit rate:

if the current internet speed is higher than the lowest bit rate, the video can be played smoothly;

if the current internet speed is lower than the lowest bit rate, the video would stutter and cannot be played, as the lowest rate is the minimum requirement to be met to play videos.

For example, the current internet speed is 2.5M bps. After comparing the speed with the bit rates on the video server, the highest bit rate supported by the given internet speed, 2M, is chosen. Then the video segment corresponding to the bit rate is loaded and played.

After five minutes, the fourth step, the internet speed test, is completed. The player starts to switch to a different video source at T=20131218181122, automatically transiting to the highest bit rate supported by the current internet speed. A time stamp is also recorded at the point where the previous video has been playing, namely 300 seconds (300 s) after the video starts. Therefore, the new video source will be played from the 300 s mark. So if the internet speed can support bit rate 2M, the video segment corresponding to bit rate 2M would be loaded and played.

Step five: upgrading the bit rate based on the resolution of the playing terminal (e.g. a mobile phone).

Step one has already obtained the required bit rate standard if a HD video is to be played on a mobile phone. When the internet speed reaches 2.5M, the mobile phone can play videos corresponding to bit rate 2M, meeting a SD standard. It means that a 720p mobile phone is able to play a SD 480p video, but the phone's capability is not fully utilized if it only plays SD 480p videos.

After other download tasks are completed, the network resources would be released and the internet speed would be upgraded to 5M. Then the mobile phone will request the video server to play videos corresponding to bit rate 5M. By doing so, the mobile phone's 720p capability is fully utilized, so that it can load and play video segments whose resolution is 720p.

On the contrary, if the mobile phone sensed that the internet speed slows down. the mobile phone of the present embodiment would automatically load and play the video segment corresponding to a lower class of bit rates.

In addition, if the result of the functional testing of step one shows that the mobile phone can only support videos up to SD 480p, then even if the network traffic permits, the method of the present embodiment would not upgrade the bit rate but stay with the optimum bit rate that can be supported by the playing terminal (e.g. a mobile phone). It not only saves the cost of the network but also protects the central processing unit (CPU) of the mobile phone.

Therefore, the present invention provides a player for smart streaming media playback with a method for online video playback that ensures smooth and uninterrupted playback for the users' convenience.

Figure 2:
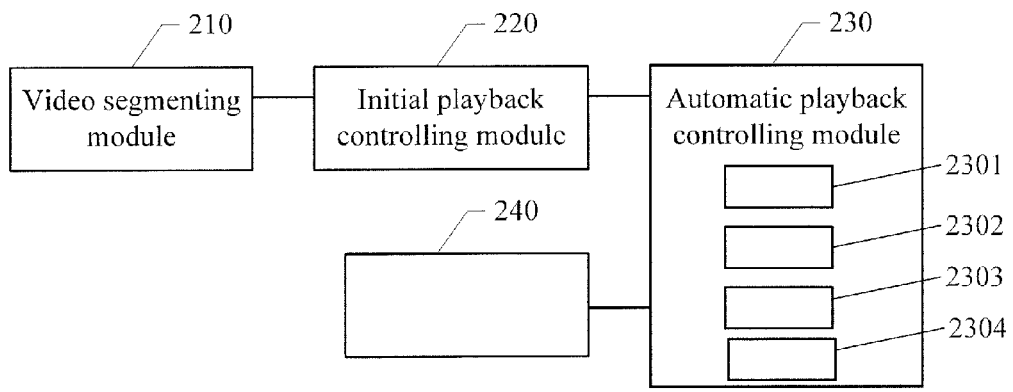
FIG. 2 shows a block diagram of a system for online video playback according to a preferred embodiment of the present invention.

Based on the present embodiment, the present invention further provides a system for online video playback, as shown in FIG. 2. The system comprises:

A video segmenting module 210 is used for segmenting a video into several versions targeting different bit rates, from low to high, in advance. The video segment of each version corresponds to a specific class of bit rates. Please refer to step S100 for specifics.

An initial playback controlling module 220 is used for controlling the player to begin by loading and playing the first video segment corresponding to the lowest class of bit rates from the version of the lowest class of bit rates. Please refer to step S200 for specifics.

An automatic playback controlling module 230 is used for controlling the player to automatically test the network traffic after the video has been playing steadily. According to the bit rate corresponding to the current network traffic and the resolution supported by the playing terminal, the player chooses to load and play the video segment corresponding to an appropriate class of bit rates. Please refer to step S300 for specifics.

Furthermore, the present system for online video playback further comprises a test and calculation module 240 for testing the resolution that can be supported by the playing terminal, and calculating the optimum bit rate that can be supported by the playing terminal. Please refer to relevant texts hereinbefore for specifics.

Furthermore, in the present system for online video playback, the automatic playback controlling module comprises:

an automatic test unit 2301, for testing automatically the network traffic after the video has been playing steadily. Please refer to relevant texts hereinbefore for specifics.

a determining unit 2302, for determining whether high-bit rate videos should be chosen and played later according to the current network traffic. Please refer to relevant texts hereinbefore for specifics.

an upgrade controlling unit 2303, for gradually transiting to the highest bit rate when the network traffic is good. And, when the internet environment permits, automatically choosing to play the video segments corresponding to the appropriate bit rate according to the resolution of the playing terminal. Please refer to relevant texts hereinbefore for specifics.

a downgrade controlling unit 2304, for transiting to a low-bit rate version when the network traffic is busy. And, when the internet environment permits, automatically choosing to play the video segments corresponding to the appropriate bit rate according to the resolution of the playing terminal. Please refer to relevant texts hereinbefore for specifics.

Based on the previously described embodiment, the present invention further provides an embodiment of a player, which adopts the method for online video playback proposed by the previously described embodiment.

Based on the previously described embodiment, the present invention further provides an embodiment of a mobile terminal, which comprises the player proposed by the previously described embodiment.

The online video playback system of the present embodiment is formed on a terminal, such as computer, tablet PC, or mobile phone. The online video playback system and the online video playback method in the previously described embodiment are generated from the same concept. On the online video playback system, any of the online video playback methods proposed by the previously described embodiment is operable. Please refer to the embodiment of the online video playback method for specifics.

What needs to be elaborated is that the process of the online video playback method of the present embodiment can be fully or partially understood by an ordinary technician in this field. It can be completed through controlling relevant hardware by computerized procedure. The computerized procedure can be stored in a computer-readable storage medium, such as the memory of a terminal, and processed by at least one processor in the terminal. The processing can comprise procedures of different methods proposed by the previously described embodiment. The storage medium can be a disk, compact disk, read-only memory (ROM) or random-access memory (RAM).

The modules of the online video playback system of the present embodiment can be integrated in a processing chip. They can also be independent standalones. Or, any two or more than two of them can be integrated in a module. The integration of modules can be realized as hardware, or software function modules. The integrated modules, if realized as software function modules and sold or used as an independent product, can also be stored in a computer-readable storage medium, such as a disk, compact disk, or ROM.

To sum up, the method, system, player and mobile terminal for online video playback provided by the present invention equip the mobile terminal player with a new function: automatically choosing videos encoded at an appropriate bit rate according to the current internet speed when playing online videos. It provides the convenience of smooth and uninterrupted playback to users.

The player for smart streaming media playback proposed by the present invention further comprises following functions:

1) The player chooses to play files encoded at a lower bit rate first when starting to play a video. Videos encoded at a lower bit rate comprise smaller amount of data, therefore the buffer time becomes shorter.

2) The player tests the network traffic and automatically switches to the highest bit rate possible with the current status when connecting to the internet. If the network traffic deteriorates, the player would adjust itself and automatically switch to lower bit rate. When the network traffic is good, the player would switch to a higher bit rate so that playing the video becomes clearer and smoother.

3) The player can calculate the optimum bit rate according to a mobile phone's screen resolution, and adjust to the optimum bit rate when it is supported by the internet speed.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method for online video playback, comprising:
segmenting a video into several versions of video segments targeting different bit rates form low to high in advance, with video segments of each version corresponding to a specific class of bit rates, wherein classes of different bit rates from low to high as referred to in the step of segmenting the video into several versions of video segments corresponding to different bit rates form low to high in advance, comprise: a first class of bit rates from 700 to 1199 kbps, a second class of bit rates from 1200 to 2500 kbps, a third class of bit rates from 2051 kbps to 2 Mbps, and a fourth class of bit rates from 2 Mbps to 10 Mbps and above;
loading the first video segment corresponding to the lowest class of bit rates from the version of the lowest class of bit rates at an initial playback;
testing automatically the network traffic according to a predefined time interval after the video has been playing steadily;
determining whether to choose a high-bit rate video segment to play later according to the current network traffic;
upgrading gradually to the highest bit rate if the network traffic is good; if the internet environment permits, choosing automatically and playing the video segment corresponding to an appropriate bit rate according to the resolution of a playing terminal; and
downgrading gradually to low-bit rate video segments if the network traffic is busy; if the internet environment permits, choosing automatically and playing the video segment corresponding to appropriate bit rate according to the resolution of a playing terminal.

2. The method of claim 1, wherein the step of segmenting the video into several versions of video segments targeting different bit rates form low to high in advance, further comprises organizing the information of video segments of different versions into a profile.

3. The method of claim 1, wherein steps before loading and playing the first video segment corresponding to the lowest class of bit rates from the version of the lowest class of bit rates at an initial playback further comprise testing the resolution that can be supported by a playing terminal and calculating the optimum bit rate that can be supported by the playing terminal.

4. The method of claim 1, wherein steps after the loading and playing of the first video segment corresponding to the lowest class of bit rates from the version of the lowest class of bit rates further comprise:
  recording a time stamp at the point where the playback of the first video segment stops;
  choosing and playing the video segment corresponding to an appropriate class of bit rates; specifically, playing the chosen video segment corresponding to the appropriate class of bit rates from the time stamp of the first video segment.

5. A method for online video playback, comprising:
  segmenting a video into several versions of video segments targeting different bit rates form low to high in advance, with video segments of each version corresponding to a specific class of bit rates, wherein classes of different bit rates from low to high as referred to in the step of segmenting the video into several versions of video segments corresponding to different bit rates form low to, high in advance, comprise: a first class of bit rates from 700 to 1199 kbps, a second class of bit rates from 1200 to 2500 kbps, a third class of bit rates from 2051 kbps to 2 Mbps, and a fourth class of bit rates from 2 Mbps to 10 Mbps and above;
  loading the first video segment corresponding to the lowest class of bit rates from the version of the lowest class of bit rates at an initial playback; and
  testing automatically the network traffic, and choosing to load and play a video segment corresponding to an appropriate class of bit rates according to the bit rate corresponding to the current network traffic and the resolution supported by a playing terminal after the video has been playing steadily.

6. The method of claim 5, wherein the step of segmenting the video into several versions of video segments targeting different bit rates form low to high in advance, further comprises organizing the information of video segments of different versions into a profile.

7. The method of claim 5, wherein the steps of choosing to load and play the video segment corresponding to an appropriate class of bit rates according to the bit rate corresponding to the current network traffic and the resolution supported by a playing terminal after the video has been playing steadily, comprises:
  testing automatically the network traffic after the video has been playing steadily;
  determining whether to choose a high-bit rate video segment to play later according to the current network traffic;
  upgrading gradually to the highest bit rate if the network traffic is good; if the internet environment permits, choosing automatically and playing the video segment corresponding to an appropriate bit rate according to the resolution of a playing terminal;
  downgrading gradually to low-bit rate video segments if the network traffic is busy; if the internet environment permits, choosing automatically and playing the video segment corresponding to appropriate bit rate according to the resolution of a playing terminal.

8. The method of claim 5, wherein steps before loading and playing the first video segment corresponding to the lowest class of bit rates from the version of the lowest class of bit rates at an initial playback further comprise testing the resolution that can be supported by a playing terminal and calculating the optimum bit rate that can be supported by the playing terminal.

9. The method of claim 5, wherein steps to retrieve the bit rate corresponding to the current network traffic comprise:
  retrieving the speed of the current network by applying for a speed test to a speed-testing website through the website's interface;
  choosing the highest bit rate that can be supported by the current internet speed after comparing the internet speed with the bit rates on a video server.

10. The method of claim 5, wherein the step of the player automatically testing the network traffic comprises: the player automatically testing the network traffic according to a predefined time interval.

11. The method of claim 5, wherein steps after the loading and playing of the first video segment corresponding to the lowest class of bit rates from the version of the lowest class of bit rates further comprise:
  recording a time stamp at the point where the playback of the first video segment stops;
  choosing and playing the video segment corresponding to an appropriate class of bit rates; specifically, playing the chosen video segment corresponding to the appropriate class of bit rates from the time stamp of the first video segment.

12. A system for online video playback, comprising:
  a processor; and
  a memory connected with the processor, the memory comprising a plurality of program instructions executable by the processor, the plurality of program instructions comprising:
  a video segmenting module, for segmenting a video into several versions of video segments targeting different bit rates from low to high in advance, with the video segment of a version corresponding to a specific class of bit rates,, wherein classes of different bit rates from low to high as referred to in the steps of segmenting the video into several versions of video segments corresponding to different bit rates form low to high in advance comprise: a first class of bit rates from 700 to 1199 kbps, a second class of bit rates from 1200 to 2500 kbps, a third class of bit rates from 2051 kbps to 2 Mbps, and a fourth class of bit rates from 2 Mbps to 10 Mbps and above;
  an initial playback controlling module, configured to cause the processor to control the player to begin by loading and playing the first video segment corresponding to the lowest class of bit rates from the version of the lowest class of bit rates;
  an automatic playback controlling module, configured to cause the processor to control the player to automatically test the network traffic after the video has been playing steadily, and choose to load and play a video segment corresponding to an appropriate class of bit rates according to the bit rate corresponding to the current network traffic and the resolution that can be supported by the playing terminal.

13. The system of claim 12, wherein the automatic playback controlling module comprises:
  an automatic test unit, configured to cause the processor to test automatically the network traffic after the video has been playing steadily;
  a determining unit, configured to cause the processor to determine whether high-bit rate videos should be chosen and played later according to the current network traffic;

an upgrade controlling unit, configured to cause the processor to gradually transit to the highest bit rate and to automatically choose to play the video segments corresponding to the appropriate bit rate according to the resolution of the playing terminal when the internet environment permits;

a downgrade controlling unit, configured to cause the processor to transit to a low-bit rate video version when the network traffic is busy, and to automatically choose to play the video segments corresponding to the appropriate bit rate according to the resolution of the playing terminal when the internet environment permits.

14. The system of claim 12, further comprising:

a test and calculation module, configured to cause the processor to test the resolution that can be supported by the playing terminal, and to calculate the optimum bit rate that can be supported by the playing terminal.

15. The system of claim 13, wherein the automatic test unit further automatically tests the network traffic according to the predefined time interval after the video has been playing steadily.

16. A player for performing the method as claimed in claim 5.

17. A mobile terminal comprising a player as claimed in claim 16.

* * * * *